United States Patent [19]

Turrietta et al.

[11] Patent Number: 5,452,206

[45] Date of Patent: Sep. 19, 1995

[54] METHOD FOR GENERATING DOCUMENTATION FOR COMPUTER SOFTWARE

[75] Inventors: T. Orlando Turrietta, Oakland; Bruce W. Hamilton; Peter N. Pesic, both of San Francisco, all of Calif.

[73] Assignee: Pacific Bell, San Francisco, Calif.

[21] Appl. No.: 762,595

[22] Filed: Sep. 19, 1991

[51] Int. Cl.6 .............................................. G06F 17/22
[52] U.S. Cl. ............................. 364/419.17; 364/419.1; 395/375; 395/700
[58] Field of Search ................ 364/419, 900 MS File, 364/280, 280.4; 395/375, 700, 650; 380/4

[56] References Cited

U.S. PATENT DOCUMENTS

| | | | |
|---|---|---|---|
| 4,860,203 | 8/1989 | Corrigan et al. | 364/300 |
| 4,989,145 | 1/1991 | Kyushima | 364/419 |
| 5,038,316 | 8/1991 | Hempleman et al. | 364/900 |
| 5,129,086 | 7/1992 | Coyle, Jr. et al. | 395/650 |
| 5,157,600 | 10/1992 | Lerner | 395/700 |
| 5,185,867 | 2/1993 | Ito | 395/375 |

Primary Examiner—Gail O. Hayes
Assistant Examiner—Frantzy Poinvil
Attorney, Agent, or Firm—Townsend and Townsend Khourie and Crew

[57] ABSTRACT

Documentation is automatically generated having a specified format for a computer program having a source code consisting of a stream of characters. The ordering of the stream of characters follows a set of syntax rules. The set of syntax rules includes a set of reserved words. The specified format of the documentation and the set of syntax rules define a set of selection rules for selecting a set of selected character strings. The set of selected character strings includes at least one selected reserved word and at least one word affiliated with the selected reserved word. The stream of characters is read and the selected character strings are searched. Each time one of the selected character strings is found, at least one related character string affiliated with the found selected character string is stored in memory. After all the characters in the source code are read, the related character strings are retrieved. These related character strings provide information which enables the automatic insertion of appropriate character strings into appropriate positions in the documentation.

8 Claims, 12 Drawing Sheets

```
1   PROGRAM main_program BEGIN;
2     -* Accept choice from crt *-
3     INPUT CRT BEGIN:
4       PRINT ("CORPORATE MAIL DISTRIBUTION SYSTEM");
5       PRINT ("PLEASE SELECT A NUMBER");
6       PRINT (" 1 - INPUT/UPDATE MAIL ITEM INFORMATION");
7       PRINT (" 2 - INPUT/UPDATE ADDRESS INFORMATION");
8       PRINT (" 3 - SELECT LABELS TO BE PRINTED");
9       ACCEPT (selection_code);
10    INPUT CRT END;
11    -* Execute the choice *-
12    IF (selection_code) = 1   CALL item_program;
13    IF (selection_code) = 2   CALL address_program;
14    IF (selection_code) = 3   CALL select_program;
15  PROGRAM main_program END;
```

```
1    PROGRAM address_program BEGIN;
2    LOOP BEGIN;
3    -* Accept input from crt screen *-
4       INPUT CRT BEGIN;
5          ACCEPT (name)
6          ACCEPT (street_and_city);
7          ACCEPT (state_and_zip);
8          ACCEPT (address_mail_code);
9       INPUT CRT END;
10   -* Associate crt input with address_file *-
11      DEFINE address_file = CRT BEGIN;
12         name = name;
13         street_and_city = street_and_city;
14         state_and_zip = state_and_zip;
15         address_mail_code = address_mail_code;
16      DEFINE address_file = CRT END;
17   -* Update Address File *-
18      OUTPUT address_file BEGIN;
19         UPDATE (name);
20         UPDATE (street_and_city);
21         UPDATE (state_and_zip);
22         UPDATE (address_mail_code);
23      OUTPUT address_file END;
24   IF (PF_KEY) LOOP END;
25   PROGRAM address_program END;
```

```
1    PROGRAM item_program BEGIN;
2    LOOP BEGIN;
3    -* Accept input from crt screen *-
4       INPUT CRT BEGIN;
5           ACCEPT (mail_item_code);
6           ACCEPT (mail_item_description);
7           LOOP BEGIN;
8               ACCEPT (address_mail_code);
9           IF PF_KEY LOOP END;
10      INPUT CRT END;
11   -* Associate crt input with mail_item_file *-
12      DEFINE mail_item_file = CRT BEGIN;
13          mail_item_code = mail_item_code;
14          mail_item_description=mail_item_description
15          address_mail_code = address_mail_code
16      DEFINE mail_item_file = CRT END;
17   -* Update mail_item File *-
18      OUTPUT mail_item_file BEGIN;
19          UPDATE (mail_item_code);
20          UPDATE (mail_item_description);
21          UPDATE (address_mail_code);
22      OUTPUT mail_item_file END;
23   IF (PF_KEY LOOP) END;
24   PROGRAM item_program END;
```

```
1   PROGRAM select_program BEGIN;
2   -* Accept item_code from crt *-
3      INPUT CRT BEGIN;
4         ACCEPT (mail_item_code);
5      INPUT CRT END;
6   -* Associate crt input with mail_item_file *-
7      DEFINE mail_item_file = CRT BEGIN;
8         mail_item_code = mail_item_code;
9      DEFINE mail_item_file END;
10  -* retrieve mail_item_file *-
11     INPUT mail_item_file BEGIN;
12        ACCEPT (address_mail_code) KEY mail_item_code;
13     INPUT mail_item_file END;
14  -* Associate mail_item_file with address_file *-
15     DEFINE address_file = mail_item_file BEGIN;
16        address_mail_code = address_mail_code
17     DEFINE address_file END;
18  -* retrieve address_file records and print *-
19     INPUT address_file BEGIN;
20        ACCEPT (name) CRITERIA (address_mail_code);
21        ACCEPT (street_and_city) CRITERIA (address_mail_code);
22        ACCEPT (state_and_zip) CRITERIA (address_mail_code);
23     INPUT address_file END;
24  -* Associate address_file with temp_print_file *-
25     DEFINE temp_print_file = address_file BEGIN;
26        line_one = name;
27        line_two = street_and_city;
28        line_three = state_and_zip;
29     DEFINE temp_print_file = address_file END;
30     CALL print_label_program;
31  PROGRAM select_program END;
```

```
1      PROGRAM print_label_program BEGIN;
2      -* Create temporary file    *-
3          INPUT temp_print_file BEGIN;
4              ACCEPT (line_one);
5              ACCEPT (line_two);
6              ACCEPT (line_three);
7          INPUT temp_print_file END;
8      -* Associate temp_print_file with PRT file *-
9          DEFINE temp_print_file = PRT BEGIN;
10             line_one = line_one;
11             line_two = line_two;
12             line_three = line_three;
13         DEFINE temp_print_file = PRT END;
14     -* Print output *-
15         OUTPUT PRT BEGIN;
16             PRINT (line_one);
17             PRINT (line_two);
18             PRINT (line_three);
19             PRINT (NEW_PAGE);
20         OUTPUT PRT END;
21     PROGRAM print_label_program END;
```

| RESERVED WORD | BRIEF DESCRIPTION |
| --- | --- |
| ACCEPT | Accepting a new value from an input device or retrieve data from an input file. |
| BEGIN | Indicating the beginning of a group of codes. |
| CALL | Transferring control to a subroutine. |
| CRITERIA | Used in conjunction with ACCEPT setting the criteria for the retrieval of data. |
| CRT | Standard terminal for input and display data. |
| END | Indicating the end of a group of codes. |
| IF | Conditional statement. |
| INPUT | File declaration statement indicating an input file. |
| DEFINE | Relating field names in one file to another. |
| LOOP | Indicating a program loop. |
| OUTPUT | File Declaration statement indicating an output file. |
| PF_KEY | A special function key. |
| PRINT | Printing on a line printer. |
| PROGRAM | Indicating the group of codes is a program segment. |
| PRT | Standard output file for printing on a line printer. |
| UPDATE | Operation updating the data in a file. |

| INPUT | PROCESS | OUTPUT |
|---|---|---|
| INPUT FILE → | 3 INPUT DATA VALUES FOR FOR FILE: CRT | → FILE |
| DEFINE FILE → | 7 DEFINE DATA VALUES FOR FILE: mail_item_file | → FILE REDEFINED |
| INPUT FILE → | 11 INPUT DATA VALUES FOR FILE: mail_item_file | → FILE |
| DEFINE FILE → | 15 DEFINE DATA VALUES FOR FILE: address_file | → FILE REDEFINED |
| INPUT FILE → | 19 INPUT DATA VALUES FOR FILE: address_file | → FILE |
| DEFINE FILE → | 25 DEFINE DATA VALUES FOR FILE: temp_print_file | → FILE REDEFINED |

| FIRST COLUMN | SECOND COLUMN | THIRD COLUMN |
|---|---|---|
| INPUT | 3 | CRT |
| DEFINE | 7 | mail_item_file |
| INPUT | 11 | mail_item_file |
| DEFINE | 15 | address_file |
| INPUT | 19 | address_file |
| DEFINE | 25 | temp_print_file |

| FIRST COLUMN | SECOND COLUMN |
|---|---|
| main_program | item_program |
| main_program | address_program |
| main_program | select_program |
| select_program | print_label_program |

METHOD FOR GENERATING DOCUMENTATION FOR COMPUTER SOFTWARE

FIELD OF THE INVENTION

The present invention relates generally to computer software and, more specifically, to a method for automatically generating documentation for such computer software.

BACKGROUND OF THE INVENTION

Software documentation serves an important role in the development, use, maintenance, and upgrade of software. Most of the commercially developed computer programs are designed and coded by a team of electronic data processing (EDP) professionals including system analysts and programmers. The team relies on a set of internal documentation as a tool for communication among members of the team during software development. At the time the software is released, the software developer typically releases a set of user documentation for helping the end users to learn and use the software efficiently. In addition, a team of EDP professionals, which may or may not be the same as the team which developed the software, is generally assigned to maintain and upgrade the software after the software is released. This team relies on the set of internal documentation written by the previous EDP team to understand the design and coding of the software. This team also generates its own set of internal documentation to maintain communication among its members.

Even though the benefits of well written documentation are well known, there is general agreement among by the EDP community that the amount and extent of software documentation produced are below the desirable level. As an example, the lack of well written documentation is probably the single complaint most often voiced by the end users.

There are reasons which may account for the lack of well written documentation. First, documentation only reflects the state of the software at the time the documentation is written. Consequently, the documentation often becomes out-dated as the software undergoes revisions. This problem is particularly acute during the development phase of the software because changes are made almost daily. As a result, the documentation may well be almost obsolete by the time it is written. Second, most EDP professionals perceive the task of writing documentation as tedious and boring. They would rather spend their time working on more interesting tasks such as software design and development. Third, most projects have a tight schedule. The first priority of an EDP team, when faced with a deadline, is to produce working software. The writing of internal and user documentation often becomes a secondary concern.

Efforts has been made to automate the process of generating documentation. Computer programs for generating documentation have been developed. These documentation-generating programs have the advantage of reducing the amount of work required in generating software documentation. However, these programs still cannot solve the problem that the documentation generated does not keep pace with the changes and revisions to the software unless information relating to the changes and revisions are fed to these programs each time a change is made. This problem is further aggravated by the need to manually enter the information into these computer programs. Thus, documentation is often not produced because personnel who normally handle the task of data entry are assigned to other high priority tasks.

SUMMARY OF THE INVENTION

It is an object of the present invention to provide an improved method for generating software documentation.

It is another object of the present invention to provide a method for generating software documentation automatically.

It is a further object of the present invention to provide a method which uses the target software as input and automatically generates software documentation as output.

Broadly stated, the method of the present invention automatically generates documentation having a specified format for a computer program having a source code consisting of a stream of characters. The ordering of the stream of characters follows a set of syntax rules. The set of syntax rules includes a set of reserved words. The specified format of the documentation and the set of syntax rules define a set of selection rules for selecting a set of selected character strings. The set of selected character strings includes at least one selected reserved word and at least one word affiliated with the selected reserved word. The stream of characters is read and the selected character strings are searched. Each time one of the selected character strings is found, at least one related character string affiliated with the found selected character string is stored in memory. After all the characters in the source code are read, the related character strings are retrieved. These related character strings provide information which enables the automatic insertion of appropriate character strings into appropriate positions in the documentation.

DETAILED DESCRIPTION OF THE INVENTION

It is well known in the EDP art that certain standard types of documentation provide information which is useful in understanding almost any program. Examples of these types of documentation are the system flow chart, input-process-output (IPO) chart, data flow diagram, program catalog, program/file table, structure chart, and data dictionary. The importance of these documents in the development and maintenance of the corresponding software has been described in *Modern Structured Analysis*, by E. Yourdon, Prentice-Hall, 1989.

Prior art methods for generating software documentation require manual entry of a set of data relating to the software into a documentation-generating computer program. These methods use the entered data to generate the documentation. The method of the present invention uses the source code of the target software as input, and obtains all the information needed for generating the documentation from the source code itself. As a result, the documentation can be generated automatically without manual entry of additional data. The method of the present invention utilizes the fact that all software coded in a computer language must precisely follow a set of syntax rules of the language. By analyzing the source code using the set of syntax rules, it is possible to obtain the necessary information to generate the documentation.

As an example, many programming languages use a reserved word, e.g., "CALL", to indicate the program flow from a calling program segment to a called program segment. The syntax rules also define the exact locations in the source code where the names of the calling program segment and the called program segment can be found. By scanning the source code for all occurrences of the reserved word used to indicate program calls and locating the calling and the called program segments corresponding to each of such occurrences, it is possible to determine the entire chain of calling sequences in a computer program. Thus, in order to generate a document which traces the sequence of program calls, it is sufficient to rely on the information generated by such scanning of the source code, because the source code contains all the information relating to the calling sequence.

Different types of information are required for the generation of different documents. In each case, a set of selection rules is formulated to select a set of selected reserved words relating to the document of interest. The selection rules are formulated based on the requirements of the particular document and the set of syntax rules. In the above example, the selected reserved word is "CALL". Each member of the set of selected reserved words has one or more affiliated words, such as variable names, program names, or parameters, which can also provide information for the generation of the document. In the above example, the affiliated words are the names of the calling and the called program segments. Even though the selected reserved word and the affiliated words in the above example contain only alphanumeric characters, in general, the reserved words and the affiliated words may include symbols in addition to alphanumeric characters.

The source code is then scanned to locate all the selected reserved words and their affiliated words. For each of such words which is found in the source code, a set of related words is stored in memory. This set of related words may be the same as the words found in the source code. Alternatively, this set of related words may be in a form more suitable for the generation of the desired document. In many cases, the ordering and the frequency of occurrence of the selected reserved words and the affiliated words also provide information for generating the document. Consequently, the entire source code needs to be scanned and all the relevant words located before the initiation of the steps for generating the document.

After the entire source code is scanned, the related words are then retrieved and analyzed. The result of the analysis provides the necessary information to insert appropriate words at the appropriate places in the standard document.

Figure 1:
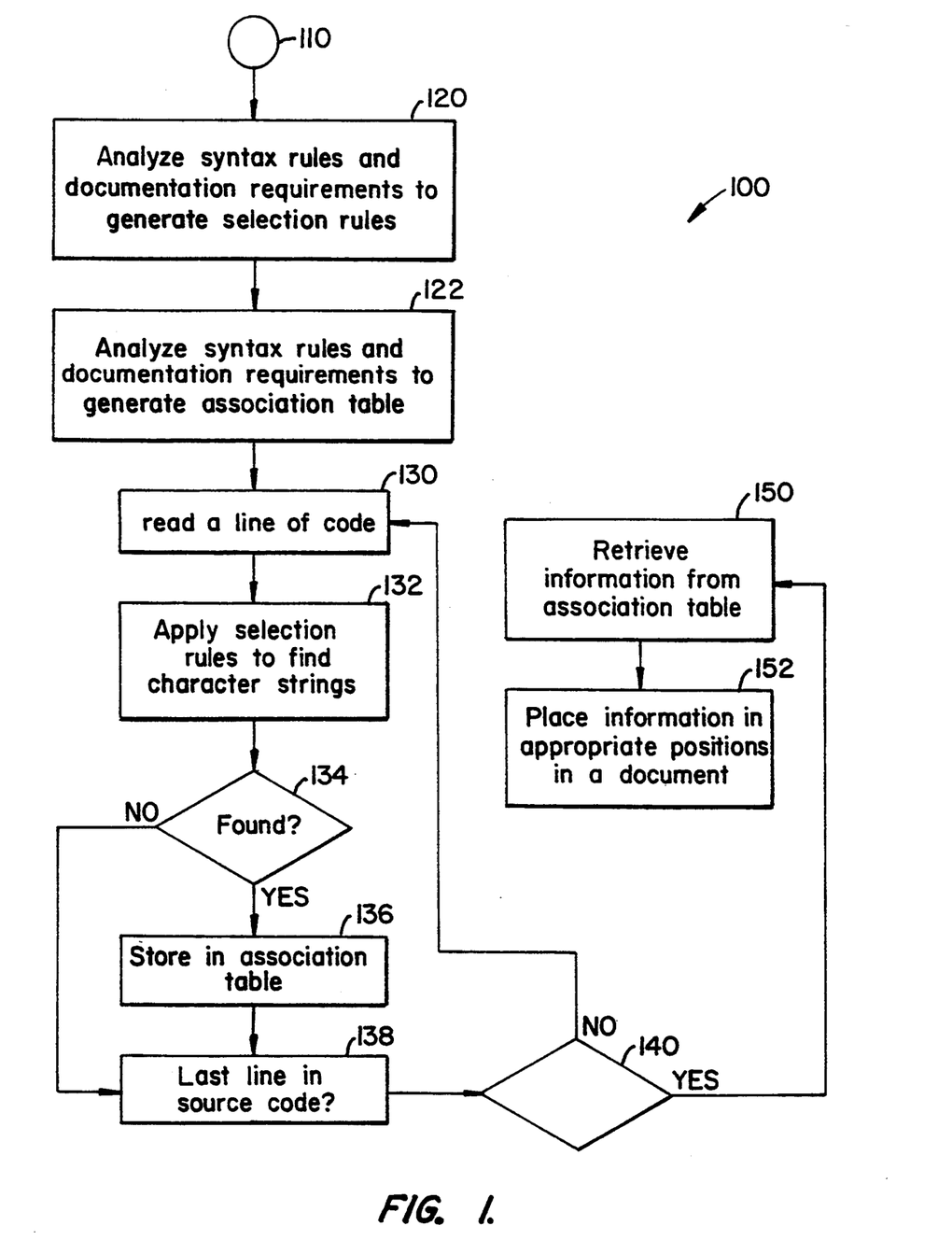
FIG. 1 is a flow chart of the automatic documentation generation method according to the present invention.

The method of the present invention is shown in flow chart 100 in FIG. 1. Flow chart 100 starts at step 110. In step 120, the syntax rules of the computer language and the requirements of the desired documentation are analyzed. A set of selection rules is derived for selecting the appropriate character strings, such as the selected reserved words, their affiliated words, and the line numbers where these words are located, in the source code of interest. The character strings may include symbols and alphanumeric characters. In step 122, the syntax rules and the requirements of the documentation are again analyzed to set up an appropriate association table. The association table is a table having a plurality of data cells. Each data cell is used to store data related to each of the selected character strings found during the scanning of the source code. The data in the association table is retrieved later to provide information for the generation of the desired documentation. Although steps 120 and 122 are listed separately, they may be carried out simultaneously or in reversed order.

In step 130, a line from the source code is read. In step 132, the set of selection rules is applied to the line of code to determine if there are character strings which satisfy the selection rules. Step 134 is a branching step. If there are such character strings in the line of code, step 136, described below, is performed. Otherwise, step 136 is skipped and flow chart 100 branches to step 138. Step 136 stores a string of related characters relating to the selected character strings in the appropriate data cells of the association table. This string of related characters could be the same as the selected character strings found in the line of code. Alternatively, this string of characters could be other character strings representative of a combination of several selected character strings. Step 138 determines if the line being processed is the last line in the source code. If the line is not the last line, step 140 branches back to step 130. If the line is the last line, step 140 branches to step 150 to allow the generation of the documentation. Step 150 retrieves the data stored in the associated table. Step 152 uses the data to generate appropriate character strings to be placed at the appropriate positions the desired document.

The method shown in FIG. 1 may be more easily understood with reference to a simple example. The example is an address label printing computer program which has its flow chart 200 shown in FIG. 2. The exemplary computer program prints address labels for putting on items which are being mailed to various persons.

Figure 2:
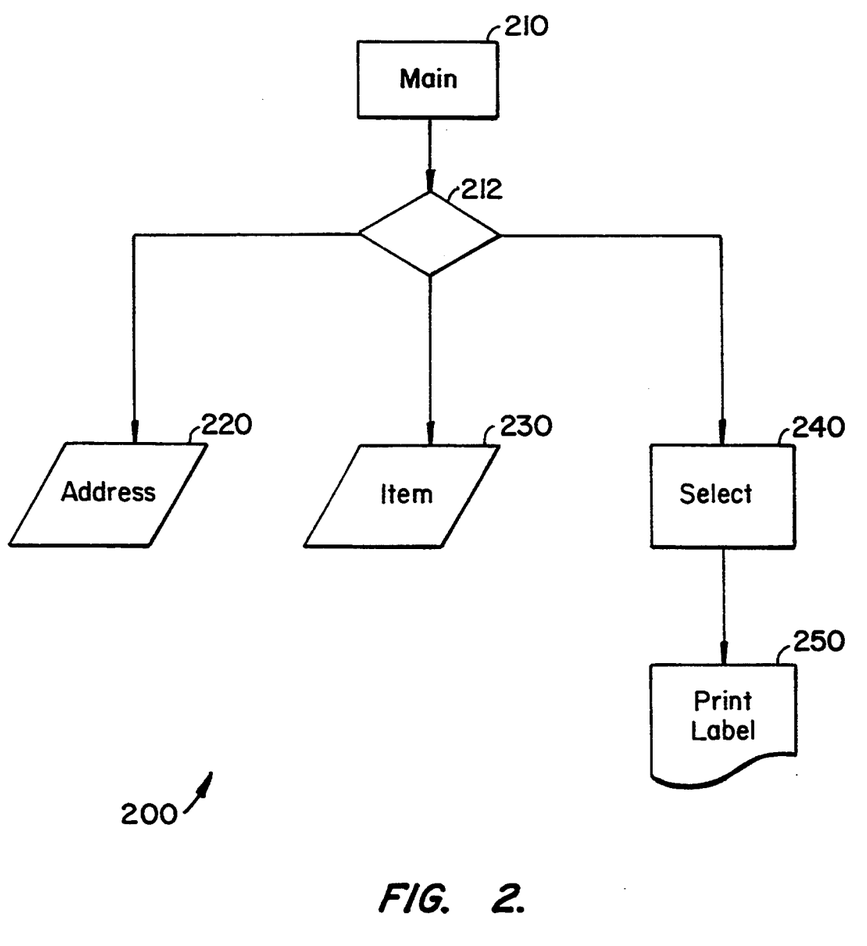
FIG. 2 is a flow chart of an exemplary computer program according to the present invention.
Figure 3:
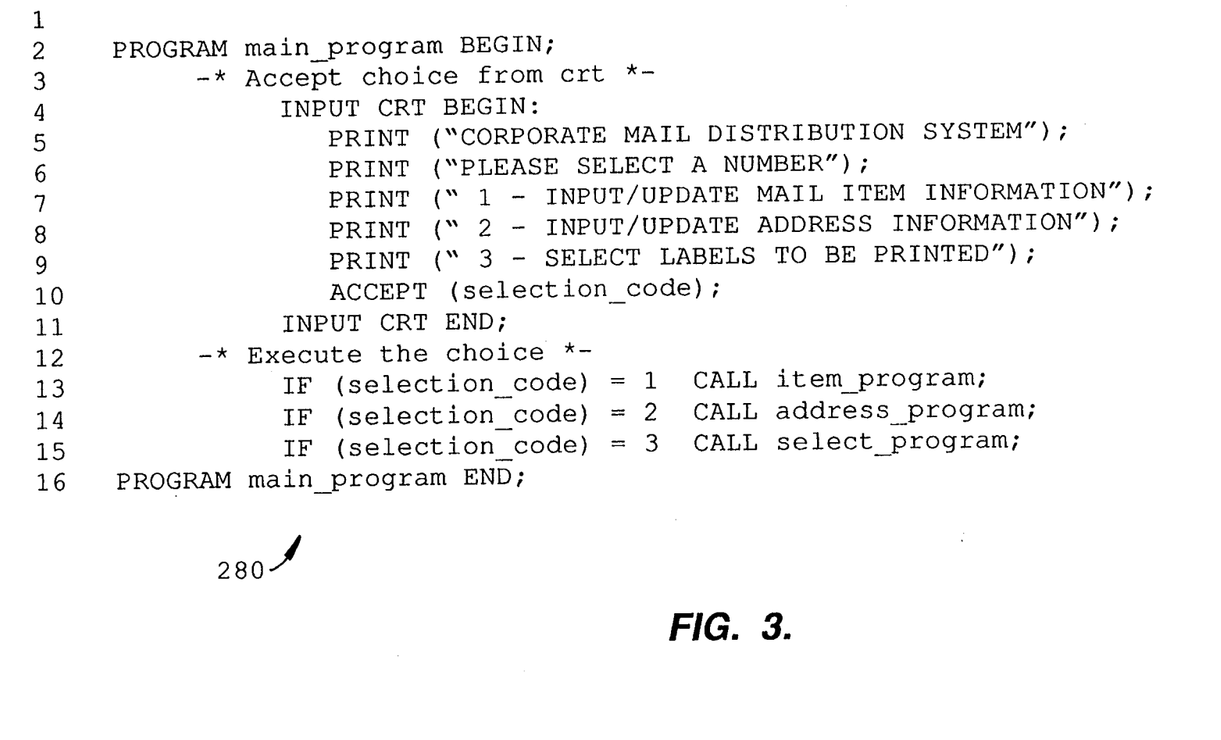
FIG. 3 is a source listing of a program segment having a name of main_program according to the present invention.
Figure 4:
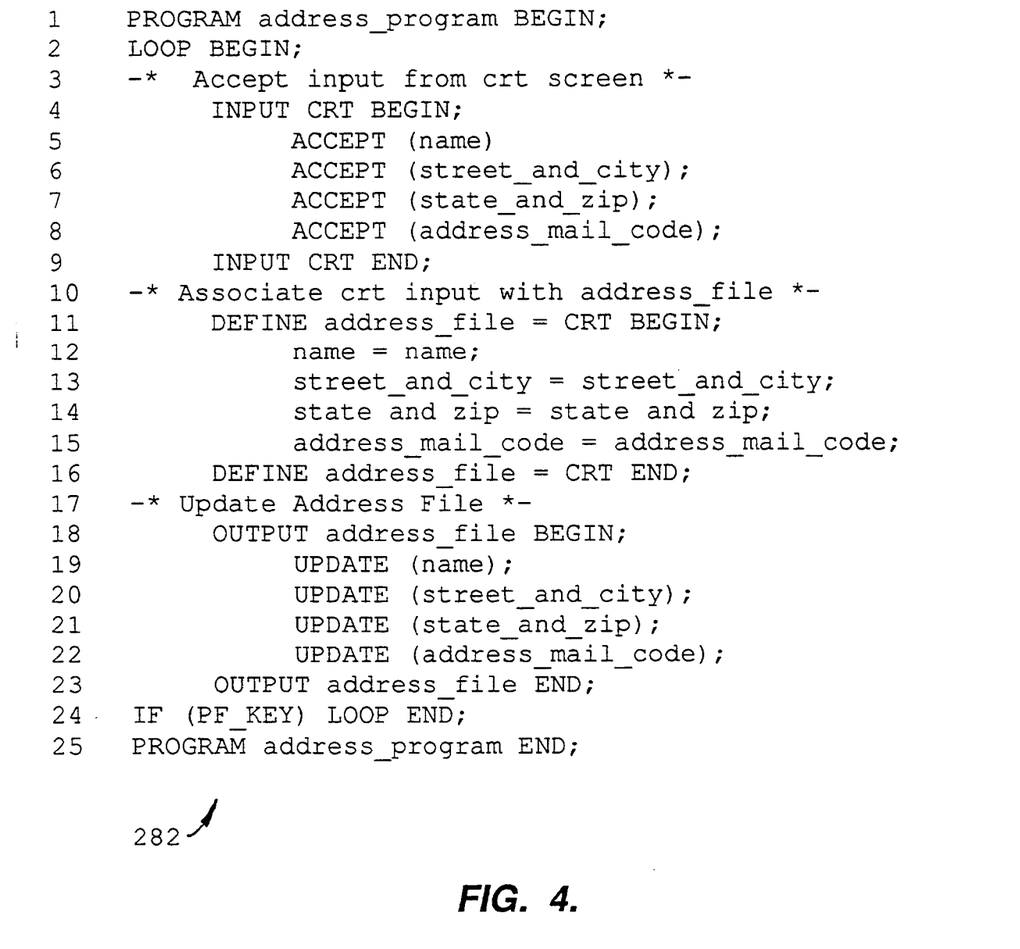
FIG. 4 is a source listing of a program segment having a name of address_program according to the present invention.
Figure 5:
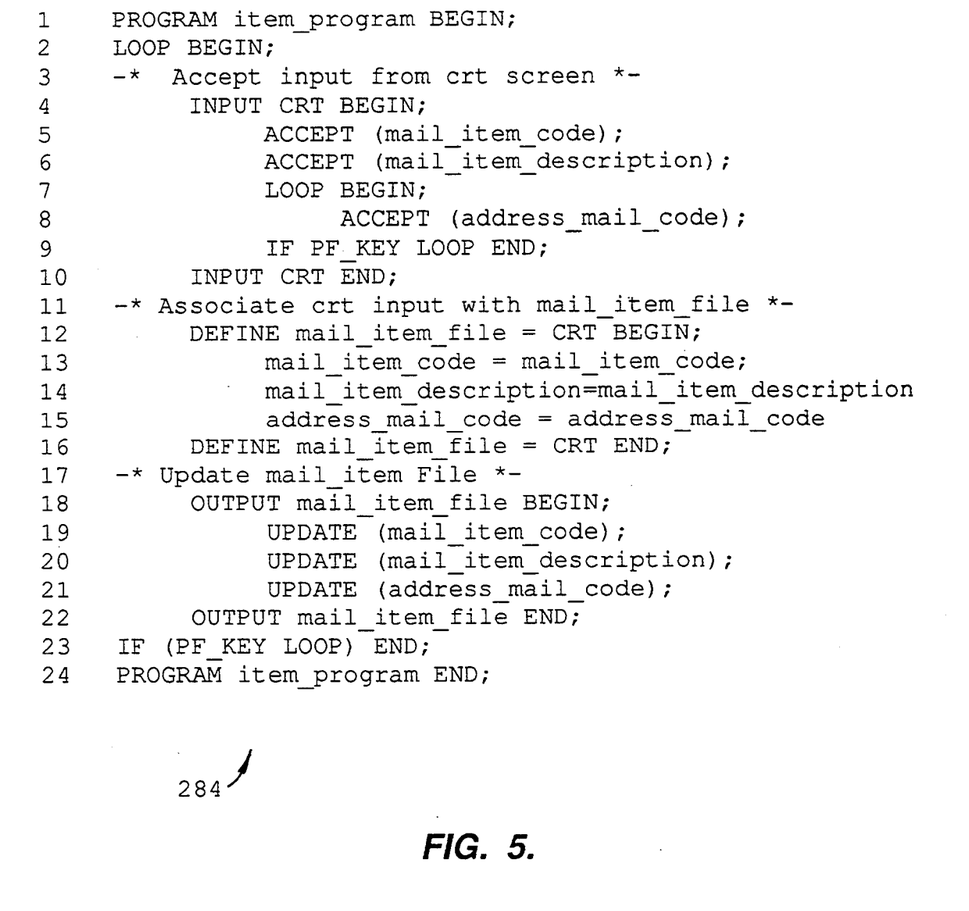
FIG. 5 is a source listing of a program segment having a name of item_program according to the present invention.
Figure 6:
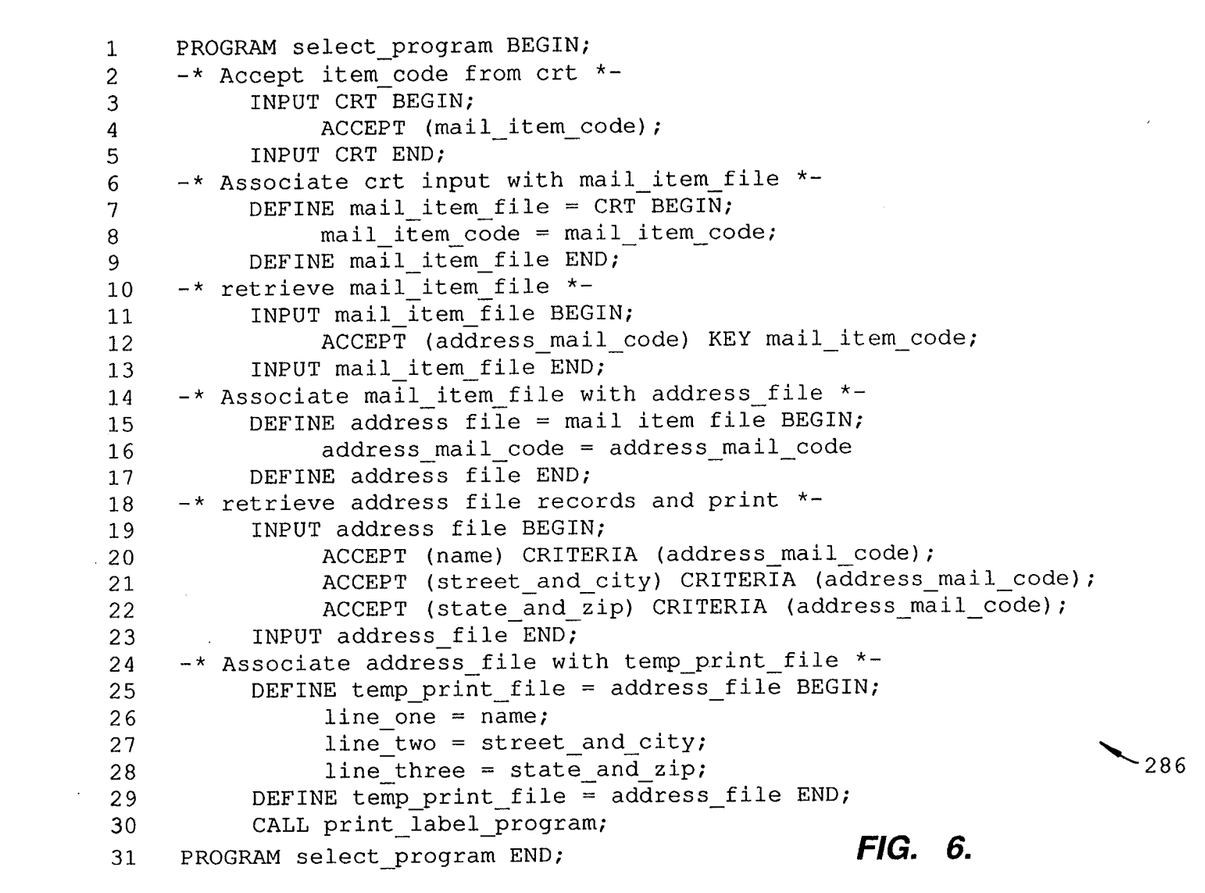
FIG. 6 is a source listing of a program segment having a name of select_program according to the present invention.
Figure 7:
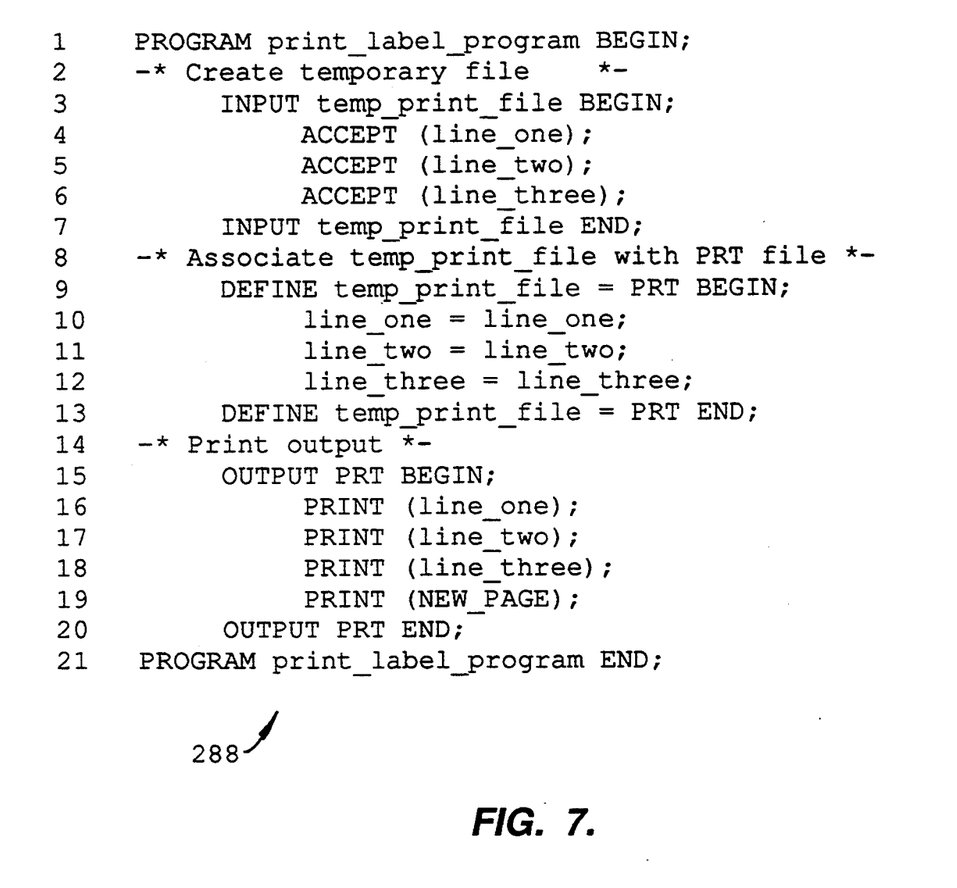
FIG. 7 is a source listing of a program segment having a name of print_label_program according to the present invention.

Flow chart 200 comprises a main block 210, an address block 220, an item block 230, a select block 240, and a print-label block 250. Main block 210 displays a menu and allows a user to direct the program flow to either address block 220, item block 230, or select block 240. Depending on the user's choice, a block 212 branches to one of the above blocks. Address block 220 allows the user to enter information relating to the names and addresses of all the persons who are to receive mailings. In addition, a mail code is entered for each person to designate the types of mail which should be sent to that person. Item program 230 allows the user to enter information relating to the item to be mailed, including an item code and a mail code. The item code is used to identify the item so that information relating to the item can be retrieved by specifying the item code. The mail code associates the item with the persons who should receive the item. Selection block 240 allows the user to enter the item code of an item for selecting the item for which labels are being printed. Selection block 240 also retrieves the mail code associated with the item code and the names and addresses of all the persons having that retrieved mail code. After the information is retrieved, selection block 240 calls print-label block 250, a subroutine, which prints the address labels using the names and addresses retrieved by selection block 240.

The address label printing computer program is divided into five program segments, one corresponding to each block in FIG. 2. The source listing for the program segments are shown in FIGS. 3–7. Listing 280, shown in FIG. 3 corresponds to main block 210. Listing 282, shown in FIG. 4, corresponds to address block 220. Listing 284, shown in FIG. 5, corresponds to item block 230. Listing 286, shown in FIG. 6, corresponds to select block 240, and Listing 288, shown in FIG. 7, corresponds to print label block 250. The programming language used for the source code is a simple language designed for easy understanding of the method of the present invention. However, the method can be applied by a person of ordinary skill in the art to computer languages of any complexity.

Figure 8:
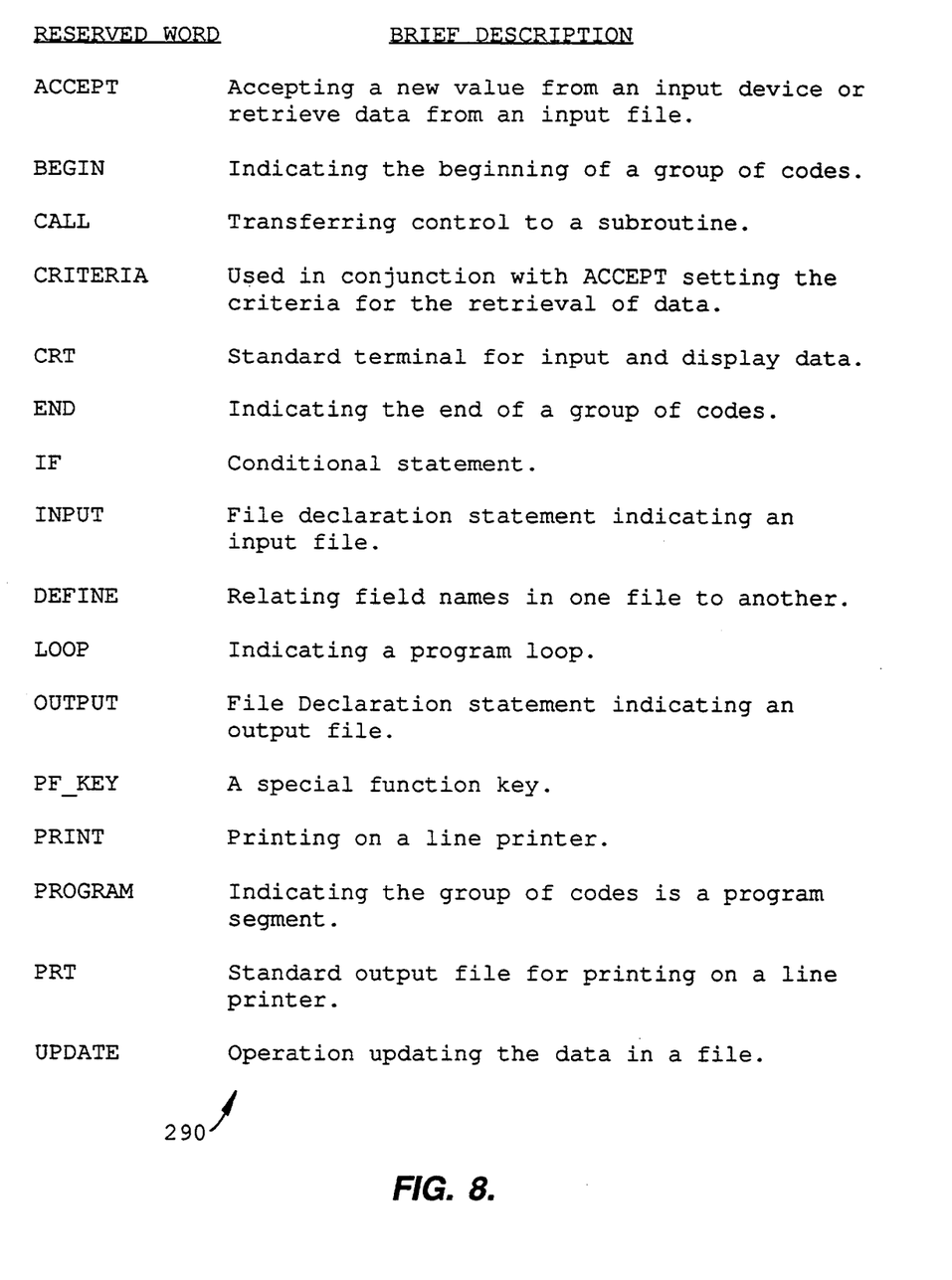
FIG. 8 is a listing of the reserved words of an exemplary computer language according to the present invention.

FIG. 8 shows a listing 290 of the reserved words of the programming language used in the exemplary label printing program. The reserved words of the language are listed alphabetically in the first column of the table and a short description of the corresponding reserved word is listed in the second column. For convenience in reading the source code shown in FIGS. 3–7, all the reserved words in the source code are printed in capital letters.

The syntax rules of the programming language are given below. The syntax rules can be divided into two main categories. The first category includes the rules which are not related to files. The second category includes the rules related to files and their associated operations.

The first category of the syntax rules comprises the reserved words BEGIN, END, PROGRAM, IF, PF_KEY, LOOP, CALL, and the comment bracket —* *—.

The reserved words BEGIN and END are used to designate the beginning and the ending, respectively, of a group of codes. These reserved words are used in combination with other reserved words, as described below.

The reserved word PROGRAM is used to designate a program segment. The first line of a program segment has the syntax of PROGRAM name_of_program BEGIN, and the last line of a program segment has the syntax of PROGRAM name_of_program END. Thus, the reserved words PROGRAM, BEGIN, and END indicate that the lines of codes between the first line and the last line, described above, belong to a program segment having a name of name_of_program.

For convenience in reading the source listing, the names of all the program segments in the source listing have the word "program" attached to the end of the name. Thus, the names of the five program segments are main_program, address_program, item_program, select_program, and print_label_program corresponding to main block 210, address block 220, item block 230, select block 240, and print-label block 250, respectively.

The reserved word IF indicates a conditional statement. The syntax is IF (condition) operation.

"Operation" is executed only if "condition" is true.

The reserved word PF_KEY indicates the pressing of a special function key by the user. The reserved words LOOP and PF_KEY are used to control the looping in the program. The syntax rules are:

LOOP BEGIN, and

IF (PF_KEY) LOOP END. These two statements indicate the looping of a series of operations between the statement LOOP BEGIN, and the statement IF PF_KEY LOOP END. The looping ends if the designated function key is pressed.

The reserved word CALL indicates the transferring of program control to a subroutine. The syntax is CALL (program_name), where program_name is the name of the subroutine.

Comments of the computer program are placed between the comment brackets, -* *-. If the programming team uses a set of rules in writing comments, this set of rules could also be used as a basis for generating documentation in a manner similar to that of the syntax rules.

The second category of the syntax rules consists of three parts relating to output files, input files, and define files. The first part, relating to output files, has the reserved words OUTPUT and UPDATE. The syntax rules associated with these reserved words are:

OUTPUT file_name BEGIN,

UPDATE (field_name), and

OUTPUT file_name END.

The reserved word OUTPUT indicates that the file having a name of file_name is an output file. The reserved word UPDATE is an operation updating the data in the designated field of a record in the file. The name of the field being updated is field_name. If there is no record in the file, the UPDATE operation creates a new record and enter the data in the appropriate field of the new record.

The second part, relating to input files, has reserved words INPUT, ACCEPT, and CRITERIA. The syntax rules associated with these reserved words are:

INPUT file_name BEGIN,

ACCEPT (field_name)CRITERIA (criteria), and

OUTPUT file_name END.

The reserved word INPUT is used to indicate that the file having a name of file_name is an input file. The reserved word ACCEPT is an operation retrieving data from a field having a name of field_name in a record of the designated file and accepting a new value from an input device if there is no record in the file. The reserved word CRITERIA is optionally associated with ACCEPT for setting the criteria for retrieving data.

The third part, relating to the define files, has a reserved word DEFINE. The syntax is DEFINE first_file=second_file BEGIN, first_file_field_name=second_file_field_name, and DEFINE first_file=second_file END.

The reserve word DEFINE is used to define the file having a name of first_file. The statements sandwiched inside the DEFINE BEGIN and DEFINE END statements define the field having a name of first_file_field_name in the file having a name of first_file to be the same as the field having a name of second_file_field_name in the file having a name of second_file.

There are two system-created files having the reserved words CRT and PRT. The reserved word PRT designates a printer. The reserved word PRINT is associated with PRT to print a variable on the printer. The reserved word CRT designates a standard terminal which can accept input and display messages on a monitor. When the reserved word ACCEPT is used in combination with CRT, it indicates accepting input from the keyboard of the terminal. When the reserved word PRINT is used in association with CRT, it indicates displaying a message on the monitor screen of the terminal.

Figure 9:
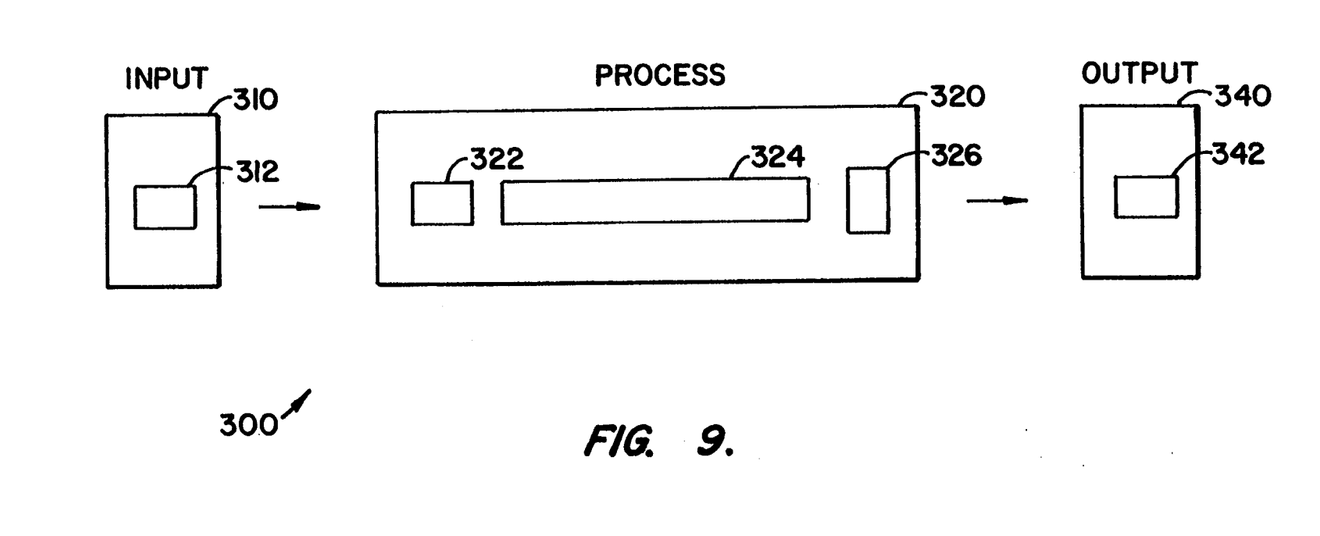
FIG. 9 shows the format of an entry in an exemplary input-process-output chart according to the present invention.
Figure 10:
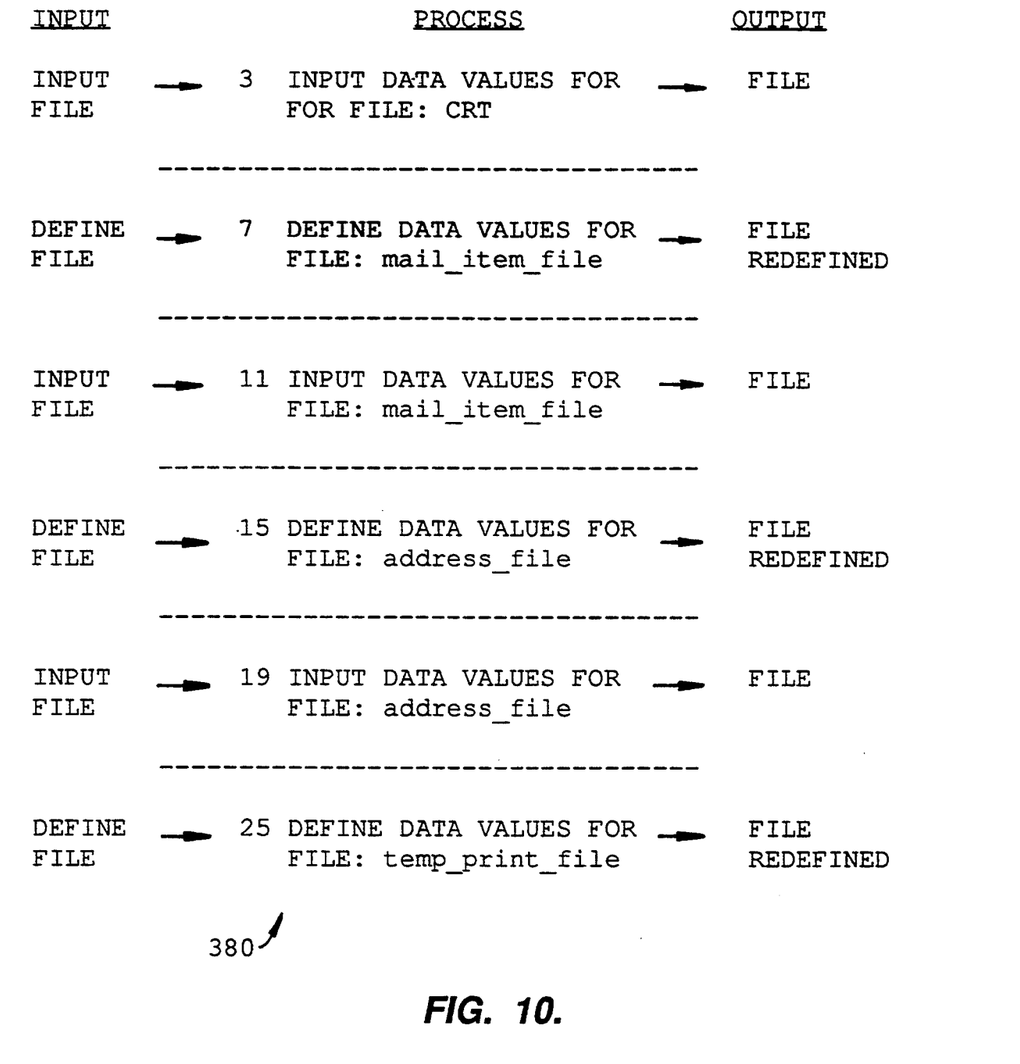
FIG. 10 shows an exemplary input-process-output chart according to the present invention.

The steps in flow chart 100, shown in FIG. 1, are used to generate an input-process-output (IPO) chart for the address label printing computer program. An IPO chart is a chart showing the detailed input and output activities of a program segment. Thus, each program segment has its own IPO chart. Preferably, the IPO chart shows the input data files, the output data files, the types of activities relating to the data files, and the line numbers indicating the locations in the program segment where the activities occur. FIG. 9 shows the general format of an IPO chart and FIG. 10 shows an exemplary IPO chart 380 for the program segment select_program. The program segment select_program is chosen because its IPO chart is the most complicated of the five program segments.

IPO chart 300 comprises three blocks, an input block 310, a process block 320, and an output block 340. Input block 310 comprises a space 312 for printing the status, i.e., input, define, or output, of the file being processed. Process block 320 has a space 326 for printing the name of the file being processed. Process block 320 also has a space 324 for printing a short sentence describing the activity e.g., inputting data, defining data, etc, on the file. Preferably, this short sentence has a prescribed format. Process block 320 further has a space 322 for printing the line number in the program segment where the activity occurs. Output block 340 comprises a space 342 for printing the status of the file after processing.

In step 120, shown in FIG. 1, a set of selection rules is formulated by analyzing the syntax rules and the requirements of the IPO chart. The reserved words INPUT, OUTPUT, and DEFINE are used as selected reserved words because these words are related to files. In addition, the corresponding file names and the line numbers are selected as affiliated words because these words provide information for the generation of the IPO chart. The selection rules can be stated as follows:

(a) If the line of source code has the character strings INPUT and BEGIN, select the character string between these words, i.e., the file name. In addition, the line number is also selected.

(b) If the line of source code has the character strings OUTPUT and BEGIN, select the character string between these words, i.e., the file name. In addition, the line number is also selected.

e) If the line of source code has the character strings DEFINE and BEGIN, select the character string between the character string DEFINE and the equal sign, i.e., the file name being defined. In addition, the line number is also selected.

Figure 11:
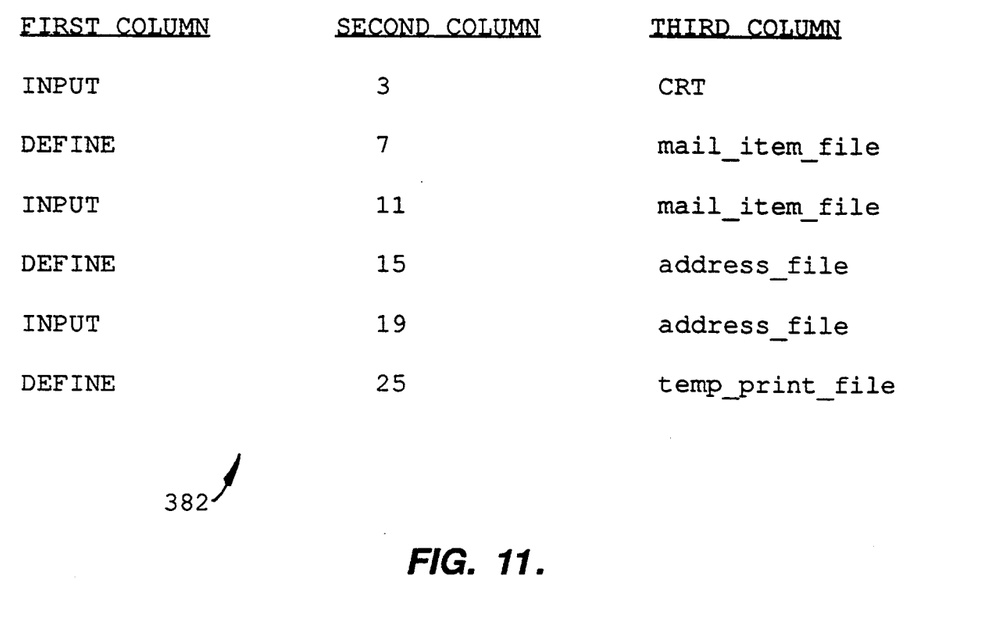
FIG. 11 is an exemplary association table used to generate the input-process-output chart of FIG. 9 according to the present invention.

In step 122, shown in FIG. 1, an association table is generated. The association table has data cells for storing information obtained using the selection rules derived above. An exemplary association table 382 used to generate an IPO chart having a format shown in FIG. 9 is shown in FIG. 11. In association table 382 of FIG. 11, columns 1-3 store information relating to spaces 3 12, 322, and 326, respectively, of FIG. 9. The information relating to spaces 324 and 342 of FIG. 9 could be generated based on the information in columns 1-3, as explained below. The rules for placing the selected character strings in the appropriate data cells of the association table are stated below:

(a) The first column is used to store one of the three selected reserved words: INPUT, OUTPUT, and DEFINE.

(b) The second column is used to store the line number associated with each of the selected reserved words in the first column.

(c) The third column is used to store the selected file name associated with each of the selected reserved words in the first column.

Each line in program segment select_program is analyzed using steps 130 to 138 in flow chart 100 until all the lines are processed. The selected character strings found in the scanning are placed in the appropriate data cells. Association table 382, shown in FIG. 11, is an association table for select_program after all the lines in the source listing of program segment select_program are processed. The information in association table 382 is used to generated IPO chart 380, shown in FIG. 10, as described below.

As was describe above, IPO chart 300, shown in FIG. 9, has a space 312 inside input block 310 to indicate the status of the input file. In this example, space 312 comprises two words. The first word is the word stored under the first column of association table 382, shown in FIG. 11, and the second word is the word "FILE".

Space 322 inside process block 320 is for printing the line number. The line number can be obtained from the second column of association table 382, shown in FIG. 11.

Space 324 inside process block 320 contains a short sentence describing the process. In this program, there are only three operations, i.e., input, update, and define. Thus, only three sentences are required to describe all the processes in program segment select_program. The sentences are "INPUT DATA VALUES FOR FILE: ", "UPDATE DATA VALUES FOR FILE: ", and "DEFINE DATA VALUES FOR FILE: " corresponding to the words "INPUT", "OUTPUT", and "DEFINE", respectively, stored in the first column of association table 382, shown in FIG. 11.

Space 326 inside process block 320 contains the name of the file being processed. This information is stored in the third column of association table 382, shown in FIG. 11. Space 342 in output block 340 contains the status of the file after processing. The information for printing this space can be obtained from the first column of association table 382, shown in FIG. 11. The words printed on this space are "FILE", "FILE REDEFINED", and "UPDATED FILE", corresponding to the words "INPUT", "DEFINE", and "OUTPUT", respectively, stored in the first column of the association table.

The retrieval of information from the association table, described above, is an exemplary operation of step 150, shown in FIG. 1. The printing of the appropriate character strings in the appropriate places in IPO chart 380, shown in FIG. 10, is an exemplary operation of step 152, shown in FIG. 1.

Figure 12:
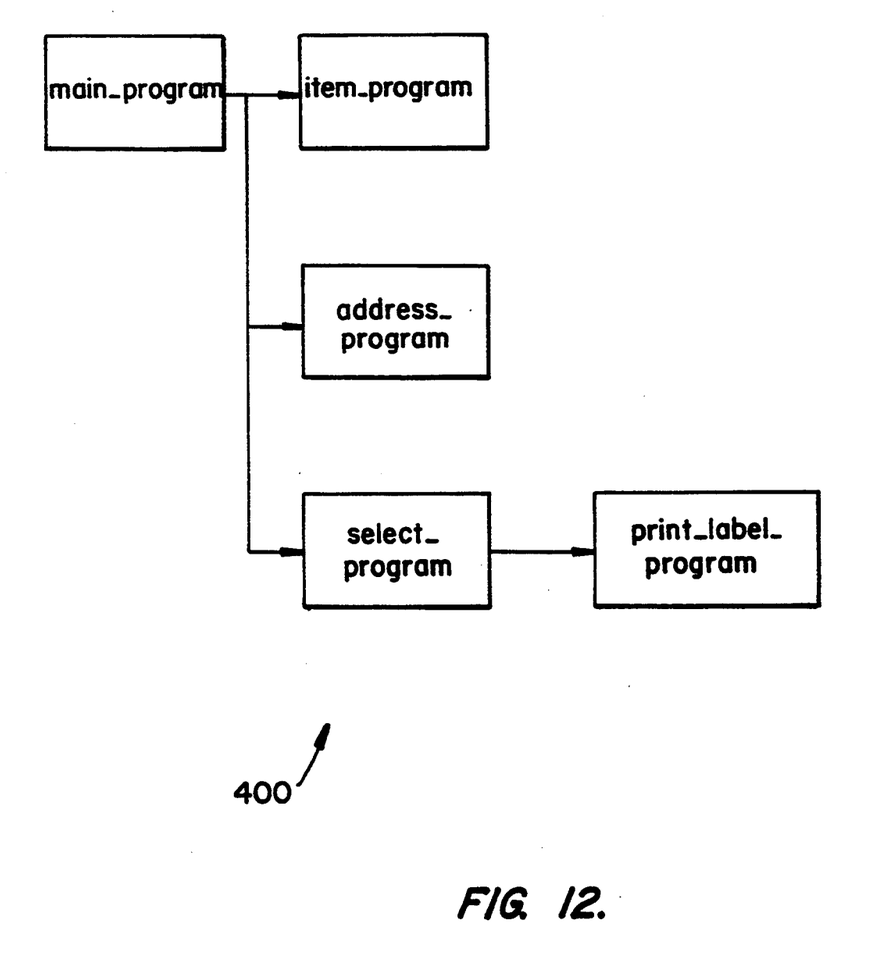
FIG. 12 shows an exemplary system flow chart according to the present invention.

The steps in flow chart 100, shown in FIG. 1, can also be used to generate a system flow chart. A system flow chart is a comprehensive, multi-level drawing showing a sequence of program calls from the main program to the various subroutines. This drawing exhibits the entire structure of the program. An exemplary system flow chart 400 for the address label printing program is shown in FIG. 12.

At step 120, shown in FIG. 1, a set of selection rules is derived. The selected reserved word is CALL and the affiliated words are the names of the calling and the called program segments. The selection rules can be stated as follows: (a) If the line of source code has the character string "CALL", the name of the called program segment is the character string following the reserved word CALL. (b) The name of the calling program segment can be obtained from the character string between PROGRAM and BEGIN.

Figure 13:
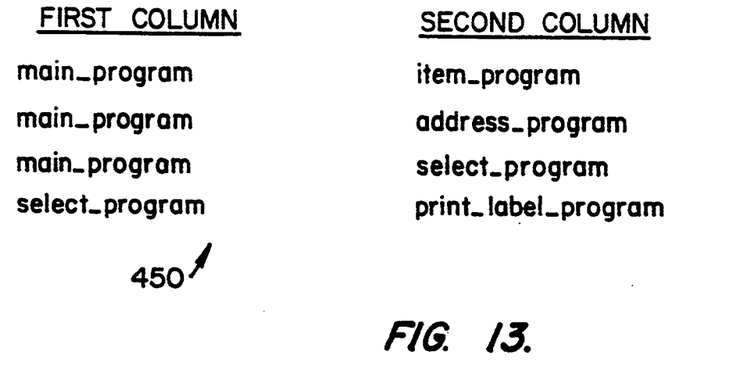
FIG. 13 is an exemplary association table used to generate the system flow chart of FIG. 12 according to the present invention.

At step 122, shown in FIG. 1, an association table is set up. FIG. 13 shows an exemplary association table 450. The table comprises two columns. The first column stores the name of the calling program segment and the second column stores the name of the called program segment.

Steps 130–138, shown in FIG. 1, scan the source listings of all of the program segments, shown in FIGS. 3–7, and store the selected character strings in the appropriate places in association table 450 of FIG. 13. Steps 150 and 152 generate the system flow chart based on the association table, as explained below.

The first step in the generation of a system flow chart is to determine the starting point of the chart. This can be done by comparing each name in the first column with the names in the second column. If the name in the first column does not appear in the second column, this name is the name of a program segment which is the starting program segment of the system flow chart. Applying this comparison method to association table 450, shown in FIG. 13, it can be determined that the program segment main_program is the starting program segment of the address label printing program.

Once the starting program segment of a system flow chart is located, the system flow chart is generated by following the chain of calling sequences from the starting point to the last program segment in the chain. The last program segment in any chain is a program segment having its name only in the second column of association table 450 in FIG. 13. All the chains have to be traced. Thus, the address label printing program has three chains starting from main_program, and the program segments item_program, address_program, and print_label_program are the termination points of the chains. System flow chart 400 is generated by tracing the chains using association table 450.

Various modifications to the invention; in addition to those shown and described herein, will be apparent to those skilled in the art from the foregoing description and accompanying drawings. Such modifications are intended to fall within the scope of the appended claims.

What is claimed is:

1. A method for operating a computer to automatically generate documentation having a specified format for a computer program having a source code, said source code having a stream of characters, the ordering of said stream of characters following a set of syntax rules, said set of syntax rules including a set of reserved words, said specified format and said set of syntax rules defining a set of selection rules for selecting a set of selected character strings, said set of selected character strings including at least one selected reserved word and at least one word affiliated with said selected reserved word and distinct from said selected reserved word, said method comprising the steps of:

reading, using said computer, said stream of characters from said source code;

searching, using said computer, for said selected reserved word in said stream of characters;

storing, using said computer, in a first column of an association table, a first related character string affiliated with said selected reserved word found in said stream of characters;

storing, using said computer, in a second column of said association table, a second related character string affiliated with said selected reserved word found in said stream of characters;

retrieving, using said computer, from said association table said first and second related character strings stored in said storing steps; and     inserting, using said computer, a string of characters in response to said retrieved related character strings at a predetermined position in said documentation.

2. A method for operating a computer to automatically generate an input-process-output chart of a predetermined format for a computer program having a source code, said source code having a stream of characters, the ordering of said stream of character strings following a set of syntax rules, said set of syntax rules including a set of reserved words, said predetermined format and said set of syntax rules defining a set of selection rules for selecting a set of selected character strings, said set of selected character strings including at least one selected reserved word relating to files accessed by said computer program, said method comprising the steps of:

reading, using said computer, said stream of characters from said source code;

searching, using said computer, for a reserved word relating to said files and belonging to said set of selected character strings, in said stream of characters;

storing, using said computer, in a first column of an association table, said reserved word found in said stream of characters;

storing, using said computer, in a second column of said association table, a filename affiliated with said reserved word found in said stream of characters;

retrieving, using said computer, from said association table said reserved word found in said character stream and said filename affiliated with said reserved word in said storing step; and inserting, using said computer, a string of characters in response to said retrieved reserved word and said retrieved filename at a predetermined position in said input-process-output chart.

3. The method according to claim 1 wherein said set of selected character strings comprises character strings indicating file names, line numbers, and the reserved words related to file definition and operation.

4. The method according to claim 3 wherein said related character strings comprise character strings indicating file names, line numbers, and the reserved words related to file definition and operation.

5. A method for operating a computer to automatically generate a system flow chart of a specified format for a computer program having a source code, said source code having a stream of character strings, the ordering of said stream of character strings following a set of syntax rules, said set of syntax rules including a set of reserved words, said specified format and said set of syntax rules defining a set of selection rules for selecting a set of selected character strings, said set of selected character strings including at least one selected reserved word relating to program calls said method comprising the steps of:

reading, using said computer, said stream of characters from said source code;

searching, using said computer, for a selected reserved word relating to program calls in said stream of characters;

storing, using said computer, in a first column of an association table, a name of a calling program associated with said selected reserved word found in said stream of characters;

storing, using said computer, in a second column of said association table, a name of a called program associated with said selected reserved word found in said stream of characters;

retrieving, using said computer, from said association table said name of said calling program and said name of said called program; and inserting, using said computer, a string of characters in response to said retrieved name of said calling program and said retrieved name of said called program, at a predetermined position in said system flow chart.

6. The method according to claim 1 wherein said set of selected character strings comprises the names of program segments and a selected reserved word relating to said program calls.

7. The method of claim 6 wherein said related character strings comprise the names of the calling and the called program segments.

8. A method for automatically generating software documentation from a source code comprising the steps of:

reading said source code;

storing, using said computer, in data cells of an association table, a set of documentation data, said documentation data including a set of character strings wherein said character strings follow a set of syntax rules and wherein said step of storing includes the substeps of:

storing in a first column of said association table a reserved word included as part of said syntax rules; and storing in a second column of said association table a selected file name associated with said selected reserve word; and retrieving said documentation data stored in said storing step to create software documentation.

* * * * *